Patented Dec. 23, 1941

2,267,292

UNITED STATES PATENT OFFICE 2,267,292

ACTIVE METAL COMPOUNDS FOR ELECTRIC DISCHARGE DEVICES

Delos H. Wamsley, Verona, N. J., assignor to Radio Corporation of America, a corporation of Delaware No Drawing. Application October 31, 1940, Serial No. 363,697

7 Claims. (Cl. 250—27.5)

My invention relates to the manufacture of chemically active substances, particularly to substances adapted for introduction into electron discharge devices.

The alkaline earth berylliate described in the United States patent to Lederer 2,173,258 of September 19, 1939, is essentially an oxygen compound of berryllium and an alkaline earth metal, such as barium, and has been used commercially as getter material with good results, because it yields copious quantities of free metallic barium when heated in vacuum with little gaseous by-products. It has been found that when made under the usual factory practice there may be variations in density, or the material may be somewhat unstable with a tendency to absorb moisture, apparently because the several oxides do not always completely combine. Uncombined barium oxide, for example, is unstable in the atmosphere and rapidly changes to barium hydroxide which produces water vapor when heated, and makes the material unfit for use in radio tubes. Further, the barium content and the specific gravity of the compound may vary, making difficult the volumetric measurement of the compound.

The object of my invention is a stable active metal compound which is of uniform and high density with no free constituents, and a method of making such material adaptable to large scale manufacture.

Alkaline earth berylliates are prepared by ball-milling commercial beryllium oxide and commercial carbonate of barium, or barium and strontium, until the carbonate and oxide particles are ground to powders of small size and a thorough mixture obtained. The mixture is then fired in hydrogen at a temperature high enough to convert the barium carbonate to barium hydroxide and by this firing obtain a mass which appears to contain the oxides in partial combination. The chemical reaction must then be completed by firing for several hours, preferably in air, at a temperature high enough to sinter the particles.

According to my invention the sintering of the particles and the completion of the combination of chemical reaction which produces the berylliate is insured by adding to the powder mixture a low melting inorganic oxide reagent which appears to act as a mineralizer that promotes the crystallization of the berylliate in dense masses or aggregates from the magna obtained when the mixture is fired to sintering temperature. I have used and prefer a slightly acid reagent, such as boric anhydrides, $B_2O_3$, added as boric acid, although a strongly basic reagent such as calcium oxide has been found to be particularly useful in accelerating sintering and combining of the BaO and BeO. Other basic oxide reagents of the alkali type, such as sodium oxide, potassium oxide and lithium oxide, added as carbonates, effectively accelerate the sintering of the barium and berryllium oxide particles and promote crystallization of the compound.

In making barium or barium strontium berylliate, good results have been obtained by incorporating in the mixture of powdered barium or barium strontium carbonate and beryllium oxide between .1 and 1.0% boric acid, ball-milling in water, firing in hydrogen to obtain the hydroxide, and then firing for several hours at temperatures, such as 1300° C. or above, at which the mix sinters. An alcohol suspending medium may be used, if desired, when the reagent employed is calcium or an alkali oxide. The mixture thus treated consistently develops large crystals with a minimum of loose or uncombined oxide particles. The crystals adhere to form large dense aggregates and apparently contain in solid solution any oxides which do not chemically combine. More than 1.0% of the reagent appears to aid little the combining of the oxides.

Large batches of barium berylliate of uniform texture and specific gravity have been made according to my invention by mixing 1530 grams of commercial barium carbonate, 470 grams of commercial beryllium oxide, 2200 cc. of water, and 10 grams of commercial boric acid crystals. If desired the water may be replaced with alcohol and ten grams of powdered calcium oxide may be substituted for the boric acid crystals. This mixture is ball-milled for four hours, dried, and fired for one hour in hydrogen at about 1065° C. in flat nickel boats filled with the mixture to a depth of 1¼ inches. The mixture is then transferred to a fire clay crucible and fired in air for four hours at about 1320° C. to produce a sintered mass. The berylliate thus obtained may be used as getter material, because when heated with a reducing agent in the envelope of an electron discharge device it decomposes and evolves metallic barium. When used as a getter the material is preferably crushed to pass through a standard 200 mesh screen and mixed as a paste with an inert binder such as butyl carbitol acetate and nitrocellulose and coated upon a refractory metal core that may be electrically heated to the reaction temperature of the compound. Decomposition of the berylliate compound and liberation of the barium by heating on the core may be facilitated either by mixing a reducing agent such as powdered titanium with the berylliate or by coating the berylliate on a reducing core such as tantalum. This getter yields copious quantities of free metallic barium with little gaseous by-products when heated in vacuum. The berylliate compound may also be used as cathode material either by coating on a cathode core or by incorporating in a refractory core metal.

Practically none of the boric oxide or calcium oxide added to the mixture is lost during the high temperature firing. When, for example, .5% boric acid, which contains about .30% boric oxid, is added, spectrographic analysis shows that the finally fired material contains about .30% boric oxide, $B_2O_3$.

While the amount of beryllium oxide in the mixture disclosed above is in molecular excess of the amount necessary to form the simple berylliate compound, $BeO.BaO$, the excess seems to be advantageous. The finally fired material is homogeneous and in effect there is no uncombined beryllium oxide, as apparently the BeO enters into solid solution with the berylliate compound. It is significant that according to my invention berylliate compounds may be prepared under manufacturing practice, are stable in air, and are of uniform and high density.

I claim:

1. The method of manufacturing a coherent, uniformly dense oxygen compound of barium and beryllium stable in air for electron discharge devices, said compound containing an inorganic oxide reagent selected from the group including boric anhydride, calcium oxide, sodium oxide, potassium oxide and lithium oxide comprising mixing powders of beryllium oxide, barium carbonate and a small amount of said reagent in a liquid suspending medium which does not react with the reagent, firing the mixture in hydrogen for sufficient time and temperature to decompose said carbonate and combine at least in part the oxides of said beryllium and barium, and then firing the mixture in air to sintering temperature.

2. The method of manufacturing a uniformly dense, coherent alkaline earth berylliate compound for electron discharge devices comprising mixing powders of beryllium oxide, an alkaline earth oxide and an inorganic oxide reagent, comprising by weight up to 1% of the mixture, selected from the group including boric anhydride, calcium oxide, sodium oxide, potassium oxide, lithium oxide, and firing the mixed oxide particles to sintering temperature.

3. The method of making an oxygen compound of an alkaline earth metal and beryllium comprising mixing powders of beryllium oxide, of the alkaline earth and of boric acid in water, and firing the mixture to sintering temperature.

4. The method of making a uniformly dense, coherent berylliate compound of alkaline earth metals comprising mixing particles of beryllium oxide with particles of the alkaline earth, introducing calcium oxide into the mixture up to about 1% by weight of the mixture, and firing the mixture to sintering temperature for sufficient time to complete the chemical reaction of the beryllium oxide and alkaline earth particles.

5. A source capable of evolving barium for electron discharge devices comprising barium oxide chemically compounded with beryllium oxide and containing a small amount of a metallic oxide selected from the group including boron oxide, calcium oxide, sodium oxide, potassium oxide and lithium oxide.

6. A source of alkaline earth metal for electron discharge devices comprising a chemical compound of an alkaline earth metal, oxygen and beryllium and containing up to about 1.0%, by weight, boron oxide.

7. A source of barium free of products of decomposition for electron discharge devices consisting of oxygen chemically compounded with barium and beryllium and containing up to 1.0% by weight the metal of an inorganic oxide reagent selected from the group including boron oxide, calcium oxide, sodium oxide, potassium oxide and lithium oxide.

DELOS H. WAMSLEY.